March 9, 1965  H. J. SCHWERDHÖFER  3,172,305
CHANGE SPEED TRANSMISSION MECHANISM FOR BICYCLES
Original Filed June 25, 1958

INVENTOR:
HANS JOACHIM SCHWERDHÖFER
By
Richardson, David and Newton
ATTY'S.

United States Patent Office 3,172,305
Patented Mar. 9, 1965

3,172,305
CHANGE SPEED TRANSMISSION MECHANISM FOR BICYCLES
Hans Joachim Schwerdhöfer, Schweinfurt (Main), Germany, assignor to Fichtel & Sachs A.G., Schweinfurt (Main), Germany, a corporation of Germany
Continuation of application Ser. No. 744,610, June 25, 1958. This application Mar. 21, 1962, Ser. No. 183,002
Claims priority, application Germany, July 4, 1957, F 23,394
1 Claim. (Cl. 74—750)

This invention relates to three-speed gear units for bicycles, and more particularly to simplified pawl disengaging means.

This application is a continuation of my co-pending application Serial No. 744,610, filed June 25, 1958, now abandoned.

In the present construction, the pawls and drivers are very simple and may be cut from bar stock of appropriate cross-section; no bevelings or boreholes for the pawls are necessary. The outer hub shell is of reduced diameter. While coasting and braking the pawls remain disconnected. The pawls may be narrow, so that the structural width of the hub is reduced.

In the case of the present invention, the construction is as follows:

A pawl carrier is arranged in an axially displaceable manner to engage an axially extending portion of the ring gear member. Through the usual pull rod, the driver and the pawl carrier are simultaneously displaced axially. By this displacement, one set of pawls is brought out of engagement with cooperating ratchet teeth formed on the inner surface of the hub shell.

A smooth cylindrical guide surface is provided for freely sliding engagement by the pawls while they are disengaged from the cooperating ratchet teeth. The smooth guide surface is formed on an annular member having a beveled or frusto-conical edge defining a sloping end surface which temporarily engages the pawls during the course of their axial displacement to clear the ratchet teeth by freely sliding engagement with the smooth guide surface.

7Jimmy Howard45139DayPatsFebruary12

By the present invention, there is provided a construction which is of particularly small diameter since pawls without pins can be used, the pawls being merely trapped in recesses of the pawl carrier. These pawls can also be made narrower than usual so that the overall width of the hub is reduced. The disengagement of the pawls is effected in the simplest manner, and the construction as a whole is simplified as compared with conventional forms of construction, in that fewer parts are used. The subject matter of the invention therefore represents a particularly economical and simple development of a three-speed transmission hub with pawl mechanism.

Other objects and advantages will hereinafter appear.

In the drawing, forming part of this specification, disclosure is made of a practical and advantageous form of change speed transmission gearing embodying features of the invention.

Figure 1:
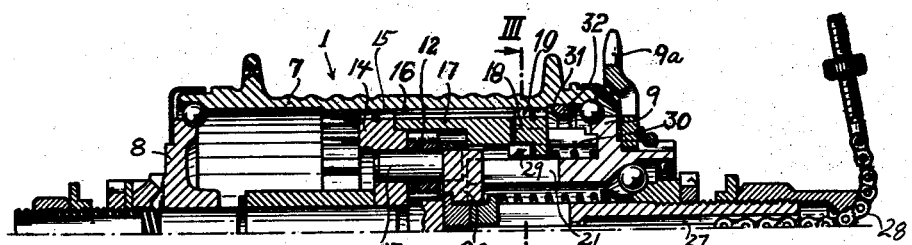
FIGURE 1 is a longitudinal sectional view of the upper half of an illustrative form of transmission gearing showing the high gear position of the mechanism, the construction of the lower half being the same as that of the upper half.

The three-speed planetary gear mechanism illustrated in FIGS. 1 to 4 is embodied in the rear wheel hub unit designated generally as 1 of a bicycle (not shown) which bicycle is of normal or conventional construction. A fixed axle 2 is clamped at its left and right ends, respectively, between nuts 3, 4 and 5, 6 to the usual rear fork part of the bicycle frame (not shown). A hollow rear wheel hub shell 7 is freely revolvubly supported at its left end by ball bearings upon a fixed bearing race member 8 and at its right end by a rotary primary driver 9, the primary driver 9 being in turn supported by a ball bearing upon a fixed bearing race member 10. The primary driver 9 is driven by the usual chain (not shown) which passes over a sprocket wheel 9a.

The axle 2 has fast upon it a fixed sun gear 11 which is in continuous meshing engagement with planet gears 12 (one shown). Each planet gear 12 is rotatably mounted on a pin or stub shaft 13 which is fixed in a rotary planet carrier 14. The planet carrier 14 carries pawls 15 on its periphery which continuously engage the left hand end portions of ratchet teeth 16 formed on the internal surface of the hollow hub shell 7. The pawls 15 operate to drive the hub 7 forwardly from the primary driver 9 when the low gear connections are established, but when the parts are in intermediate gear or high gear, the hub shell 7 is driven faster than the planet carrier 14 and overruns the pawls 15 of the planet carrier. This will be brought out more clearly as the description proceeds.

A ring gear member 17 is in continuous meshing engagement with all of the planet gears 12, and either drives the planet gears or is driven by them at all times. The ring gear member 17 is slotted to embrace radially inwardly extending rib portions of a separate axially displaceable annular or cylindrical pawl carrier 18, at the periphery of which pawls 19 are carried for engaging the right hand end portions of the teeth 16 of the hub 7 when the mechanism is set for high gear or intermediate gear. The pawls are not pivotally connected to pawl carrier 18, but are simply trapped in recesses of the carrier 18, and are of flat-sided construction. The pawls 19 are rendered inactive so that the drive may be effected through the pawls 15 in the low gear setting, as will be made clear presently.

The primary driver 9 is effective at all times to drive an axially shiftable secondary driver member 20. The secondary driver 20 extends through a slot 21 of the driver 9 and is embraced by a composite, channeled shifter 22 composed of complementary members 23 and 24. The shifter 22 moves along an axially extending slot 25 formed in the axle 2. It is constantly urged toward the left by a helical compression spring 26 which surrounds the axle 2 and bears against the right side of the shifter member 24. The shifter 22 may be drawn toward the right by a conventional gear shift arrangement which comprises a rod 27 threaded into the member 23 of the shifter 22 and a chain 28 connected to the rod.

The parts are shown in FIG. 1 as set for high gear. The secondary driver 20 is shown in position to engage the planet gear supporting pins 13 for driving the planet carrier 14 in unison with the primary driver 9. In this position, the secondary driver 20 is completely disengaged from the ring gear member 17. The planet carrier 14 is driven in unison with the primary driver 9 and, through the planet gears 12, meshing with the stationary sun gear 11, drives the ring gear member 17 at twice its own rotary speed. The ring gear member 17, through the pawl carrier 18 and the pawls 19, drives the wheel hub 7 at twice the rotary speed of the driver 9 and the planet carrier 14. The planet carrier pawls 15 are, therefore, overrun by the hub 7 and are ineffective.

Figure 2:
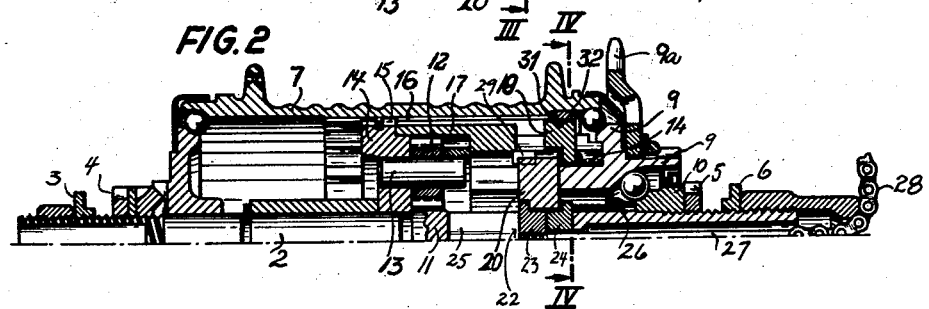
FIGURE 2 is a view similar to FIG. 1, but showing the low gear position of the mechanism.
Figure 3:
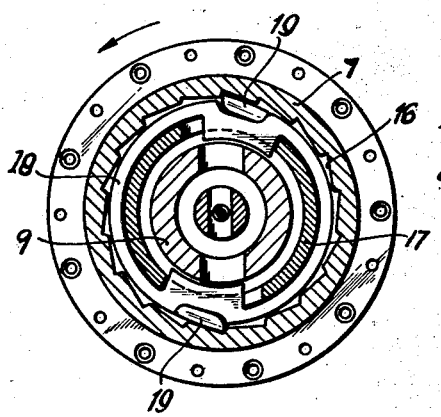
FIGURE 3 is a transverse sectional view taken upon the line III—III of FIG. 1, looking in the direction of the arrows.
Figure 4:
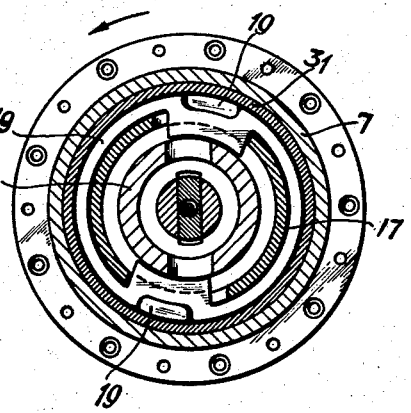
FIGURE 4 is a transverse sectional view taken on the line IV—IV of FIG. 2, looking in the direction of the arrows.

When the mechanism is in normal or intermediate gear the secondary driver 20 is out of engagement with the pins 13 but is positioned to drive the ring gear member 17 in unison with the driver 9 by engagement with the drive lugs 29. The ring gear member 17 acts through the pawl carrier 18 and the pawls 19 to drive the wheel hub 7 in unison with itself and with the primary driver 9. The planet carrier 14 is driven idly by the ring gear 17 through the planet gears 12, meshing with the stationary sun gear 11, but this connection causes the rotary speed of the planet carrier to be only one-half that of the driver 9, and hence the pawls 15 of the planet carrier is again overrun by the wheel hub 7. In FIG. 2 the mechanism is shown in low, or hill climbing, gear. The shiftable secondary driver 20 is drawn to the extreme right against the yielding pressure of compression spring 26 and forces the pawl carrier 18 against the yielding pressure of a further helical compression spring 30 to the extreme right, as shown. As the pawl carrier moves toward the right the pawls 19 are engaged by a sloping frusto-conical surface 31 of a cam ring 32. As the pawls move into the ring 32 they are smoothly engaged by the sloping surface 31 and forced inwardly to lie clear of the ratchet teeth 16 of the wheel hub 7, and are incapacitated by free sliding engagement with the smooth internal cylindrical guide surface of the cam ring 32. Drive transmitted from the driver 9 through the secondary driver 20, lugs 29, ring gear member 17, and planet gears 12, causes the planet carrier to turn at half the rotary speed of the driver 9. Since the pawls 19 are incapacitated or held in a neutral position by the ring 32, the wheel hub 7 cannot overrun the pawls 15 of the planet carrier 14 but is driven by the planet carrier 14 through pawls 15 at one-half the rotary speed of the primary driver 9.

It will be noted that the change gear hub as described contains a remarkably small number of parts. It is for that reason a particularly simple and economical unit to manufacture. The outer diameter of the hub 7 can be unusually small in view of the slight height of the pawls 19.

While I have shown and described what I believe to be the best embodiments of my invention, it will be apparent to those skilled in the art that various changes and modifications may be made therein without departing from the spirit and scope of the invention as defined in the appended claim.

What is claimed is:

A three-speed gear-shifting bicycle hub comprising; a sun gear; at least one planet gear continuously in mesh with said sun gear; a planet carrier for said planet gear, said planet carrier being revoluble coaxially with said sun gear; a ring gear member revolubly surrounding said sun and planet gears coaxially with said sun gear, said ring gear member being in continuous meshing engagement with said planet gear; a hub shell member revolubly surrounding said ring gear member coaxially with said sun gear, said hub shell member having internally projecting ratchet teeth; a primary driver revoluble coaxially with said sun gear; an axially displaceable secondary driver in continuous driving engagement with said primary driver, said secondary driver being selectively engageable with said planet carrier for high speed operation or with said ring member for intermediate and low speed operation; first pawl means carried by said planet carrier in continuous engagement with said ratchet teeth for driving said hub shell member during low speed operation; an axially displaceable pawl carrier in continuous driving engagement with said ring gear member, said pawl carrier being revoluble coaxially with said sun gear; second pawl means on said pawl carrier; cam ring means defining a smooth internal cylindrical guide surface concentric with the rotational axis of said pawl carrier, said smooth surface being located adjacent to said ratchet teeth and placed axially beyond the ends thereof, said cam ring means having a sloping frusto-conical end surface immediately adjacent to the ends of said ratchet teeth, said smooth surface being contiguous with said sloping surface and located axially beyond said sloping surface away from said ratchet teeth, said second pawl means being selectively engageable either with said ratchet teeth for intermediate and high speed operation or with said smooth surface for low speed operation by axial displacement of said pawl carrier accompanied by smooth transitory engagement between said second pawl means and said sloping surface, said pawl carrier being axially displaceable by axial displacement of said secondary driver in shifting between intermediate and low speed operation; and means for selectively displacing said secondary driver at will to obtain low, intermediate, or high speed operation.

References Cited by the Examiner

UNITED STATES PATENTS

| | | | |
|---|---|---|---|
| 1,277,070 | 8/18 | Harrison | 74—750 |
| 2,895,576 | 7/59 | Schwerdhöfer | 74—750 XR |

FOREIGN PATENTS

| | | |
|---|---|---|
| 1,090,844 | 10/54 | France. |

DON A. WAITE, *Primary Examiner.*
BROUGHTON G. DURHAM, *Examiner.*